L. J. LYNCH.
ANIMAL POKE.
APPLICATION FILED OCT. 16, 1917.
1,298,985.
Patented Apr. 1, 1919.
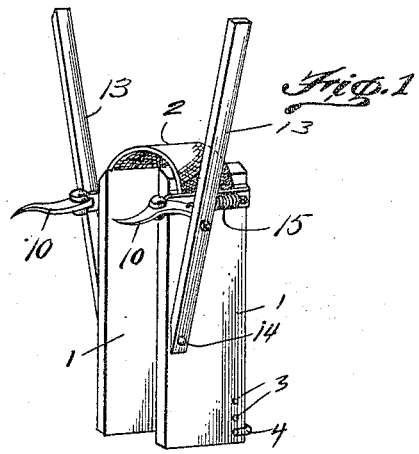
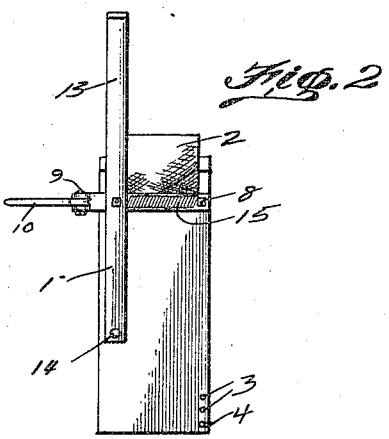
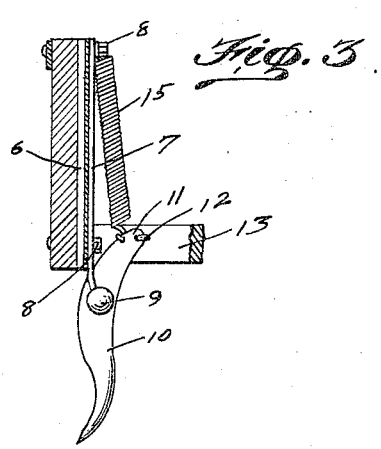
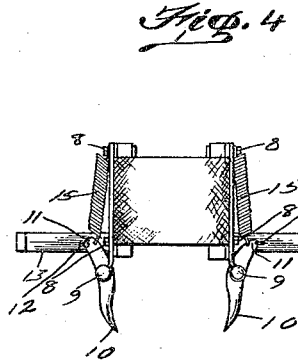
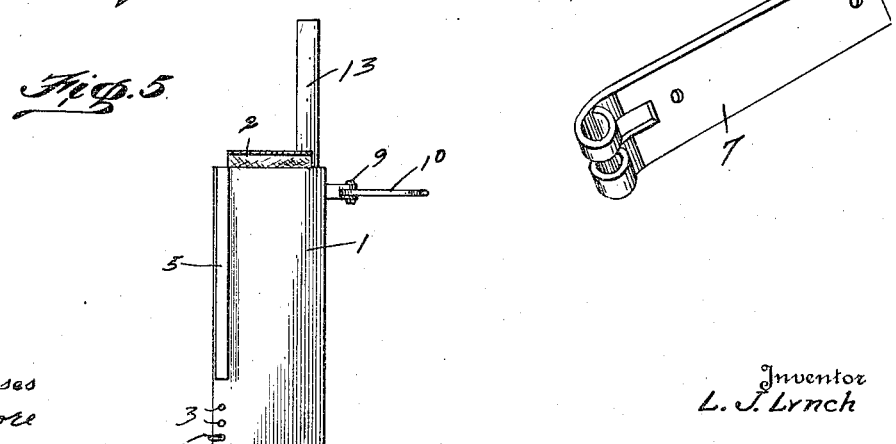
Witnesses
Inventor
L. J. Lynch
Attorneys

UNITED STATES PATENT OFFICE.

LESLIE J. LYNCH, OF LORENA, OKLAHOMA.

ANIMAL-POKE.

1,298,985.    Specification of Letters Patent.    Patented Apr. 1, 1919.

Application filed October 16, 1917. Serial No. 196,934.

*To all whom it may concern:*

Be it known that I, LESLIE J. LYNCH, a citizen of the United States, residing at Lorena, in the county of Beaver, State of Oklahoma, have invented certain new and useful Improvements in Animal-Pokes; and I do hereby declare the following to be a full, clear, and exact description of the invention, such as will enable others skilled in the art to which it appertains to make and use the same.

This invention relates to animal pokes.

The object of this invention is to provide an improved form of animal poke which is particularly adapted for use in restraining bulls, in that it does not in any way interfere with the animal's grazing or drinking, or with its service, nor does it prevent the animal from lying down. Thus, I have provided a yoke which does not extend below the animal's neck, but which is operative, as soon as the animal attempts to pass through a fence, to throw into operation a pair of prods which act upon the animal's neck to restrain his efforts to pass through the fence.

With the above objects, in view, and such others relating to the details of construction, as may hereinafter appear, my invention will now be fully set forth and described, reference being had to the accompanying drawings.

In the drawings:—

Figure 1 is a perspective view of the complete device,

Fig. 2 is a side elevation thereof,

Fig. 3 is an enlarged sectional view showing one of the prod devices,

Fig. 4 is a plan view,

Fig. 5 is a vertical section, and

Fig. 6 is an enlarged detail view of the prod mounting.

Referring more particularly to the drawings, 1 represents each of the side members of the yoke, the members 1 being preferably formed of boards of suitable width, and of such length that when their upper ends are connected by means of a strip of webbing or other material 2, their lower ends will not project to any appreciable degree below the animal's neck. The forward edges of the members 1 are pierced by a plurality of openings 3 through which a fastening connection 4 may be adjustably passed. Also, the inner faces of the boards or members 1 adjacent their forward edges are provided with strips of padding 5 which will prevent the chafing of the animal's neck.

The webbing 2 is secured to the outer faces of the boards 1, by being clamped between inner straps 6 and outer straps 7 which are secured to the boards by means of bolts 8. Each one of the outer-straps 7 is rearwardly extended beyond the edge of the board upon which it is mounted, and the extended portion is longitudinally slit and overturned to provide bearings for the vertical pins 9 which carry the prongs or prods 10. Said prongs or prods 10 are rocking plates which are intermediately pivoted upon the spindles or pins 9, and at their rear ends are turned inwardly and sharpened, and at their opposite ends are provided with the eyes 11 to which the eye bolts 12 are connected, said eye bolts 12, in turn, having their threaded ends projected through the rock levers 13. Said rock levers 13 extend from the lower rear portions of the boards 1, and are mounted upon pins 14 so that they may rock forwardly and rearwardly with relation to the yoke. Thus, when the rods or levers 13 are rocked toward the rear, they tend to throw the points of the prods 10 into the animal's neck. In order to return the levers 13 and the prods 10 to their normal positions, springs 15 are linked to the rear ends of the prods 10, and have their opposite ends connected to the foremost bolts 8. The tension of the springs is such that it is easily overcome when pressure is applied to the upper ends of the levers 13, which extend well above the side boards of the yoke.

The manner of application of the device which has been described is apparent from the foregoing description, but its particular advantage is to be recognized in the fact that when used upon a bull, none of the actions of the latter are interfered with, until an attempt is made to pass through a fence, at which time the levers 13 are brought into operation to restrain the animal from further progress, and to constrain him to desist from further attempts to pass through the fence.

What I claim as my invention is:—

An animal poke, comprising a pair of spaced flat side members, flexible webbing having its ends fixed to the upper ends of the side members for connecting the same together, means adjustably engaged in the side members near the opposite ends thereof, straps disposed transversely of said side members near their outer ends and having inwardly extending portions forming bearings, prongs pivoted in said bearings for movement at right-angles to said side members, levers disposed in outwardly divergent relation to each other and pivoted for rocking movement exteriorly on the side members, connections between the rear ends of said prongs and the levers, and coiled retractile springs connected with the prongs at their rear ends and also connected with the side members.

In testimony whereof, I affix my signature in the presence of two witnesses.

LESLIE J. LYNCH.

Witnesses:
O. H. CAFKY,
GEO. CAFKY.